(12) United States Patent
Minodier et al.

(10) Patent No.: US 8,954,547 B2
(45) Date of Patent: Feb. 10, 2015

(54) METHOD AND SYSTEM FOR UPDATING THE TELECOMMUNICATION NETWORK SERVICE ACCESS CONDITIONS OF A TELECOMMUNICATION DEVICE

(75) Inventors: David Minodier, Lannion (FR); Gilles Ivanoff, Trebeurden (FR)

(73) Assignee: France Telecom, Paris (FR)

( * ) Notice: Subject to any disclaimer, the term of this patent is extended or adjusted under 35 U.S.C. 154(b) by 1681 days.

(21) Appl. No.: 12/158,381

(22) PCT Filed: Dec. 18, 2006

(86) PCT No.: PCT/EP2006/012195
§ 371 (c)(1),
(2), (4) Date: Oct. 15, 2008

(87) PCT Pub. No.: WO2007/071360
PCT Pub. Date: Jun. 28, 2007

(65) Prior Publication Data
US 2009/0201912 A1 Aug. 13, 2009

(30) Foreign Application Priority Data
Dec. 20, 2005 (FR) .................................... 05 12994

(51) Int. Cl.
*H04L 29/06* (2006.01)
*H04L 29/08* (2006.01)
(Continued)

(52) U.S. Cl.
CPC .............. *H04L 63/08* (2013.01); *H04L 67/306* (2013.01); *H04W 12/08* (2013.01); *H04L 29/06* (2013.01);
(Continued)

(58) Field of Classification Search
CPC ......... H04L 29/06; H04L 41/50; H04L 63/08; H04L 63/102; H04W 12/06; H04W 12/08; G06F 21/31; G06F 21/44
USPC .......................... 370/352–356; 455/410, 411; 709/220–226; 726/1–4, 16, 17
See application file for complete search history.

(56) References Cited

U.S. PATENT DOCUMENTS 6,640,097 B2 * 10/2003 Corrigan et al. ........... 455/414.1
7,062,565 B1 * 6/2006 Ravindranath et al. ....... 709/229
(Continued)

OTHER PUBLICATIONS

International Search Report from counterpart foreign Application No. PCT/EP2006/012195.
(Continued)

*Primary Examiner* — Asad Nawaz
*Assistant Examiner* — Kai Chang
(74) *Attorney, Agent, or Firm* — David D. Brush; Westman, Champlin & Koehler, P.A.

(57) ABSTRACT

A system is provided for updating the conditions under which a telecommunication device accesses services provided by a telecommunication network. The system includes a network access point through which the device accesses the network, and a database, wherein the system authenticates the device via the access point on the basis of authentication data transferred by the device as well as the database storing the profile associated with the authentication data. The access point controls the conditions under which the device accesses the network services once the device has been authenticated and on the basis of the device profile. The system generates a second authentication command for the device via the access point following an alteration of the profiled associated with the authentication data.

12 Claims, 2 Drawing Sheets

(51) Int. Cl.

| | | |
|---|---|---|
| *G06F 15/16* | (2006.01) | |
| *G06F 7/04* | (2006.01) | |
| *H04L 12/66* | (2006.01) | |
| *G06F 15/177* | (2006.01) | |
| *G06F 17/30* | (2006.01) | |
| *H04W 12/08* | (2009.01) | |
| *H04L 12/24* | (2006.01) | |
| *G06F 21/31* | (2013.01) | |
| *G06F 21/44* | (2013.01) | |
| *H04W 12/06* | (2009.01) | |

(52) U.S. Cl.
CPC .................. *H04L 41/50* (2013.01); *G06F 21/31* (2013.01); *G06F 21/44* (2013.01); *H04W 12/06* (2013.01); *H04L 63/102* (2013.01)
USPC .................. 709/221; 726/4; 726/16; 455/411; 370/353; 370/356; 709/224; 709/225; 709/226

(56) References Cited

U.S. PATENT DOCUMENTS

| | | | |
|---|---|---|---|
| 7,197,125 B1* | 3/2007 | Prasad et al. | 379/201.02 |
| 7,441,043 B1* | 10/2008 | Henry et al. | 709/238 |
| 7,904,087 B2* | 3/2011 | Zhang et al. | 455/437 |
| 8,126,722 B2* | 2/2012 | Robb et al. | 705/1.1 |
| 8,127,345 B2* | 2/2012 | Gregg et al. | 726/7 |
| 8,165,299 B2* | 4/2012 | Andersson | 380/270 |
| 8,275,860 B2* | 9/2012 | Gopalakrishnan et al. | 709/220 |
| 8,553,679 B2* | 10/2013 | Gorti et al. | 370/352 |
| 8,571,222 B1* | 10/2013 | Perry et al. | 380/270 |
| 2001/0048744 A1* | 12/2001 | Kimura | 380/247 |
| 2002/0157090 A1* | 10/2002 | Anton, Jr. | 717/178 |
| 2003/0091030 A1* | 5/2003 | Yegin et al. | 370/352 |
| 2003/0186681 A1* | 10/2003 | Gabor | 455/411 |
| 2003/0194090 A1 | 10/2003 | Tachikawa | 380/270 |
| 2003/0231772 A1* | 12/2003 | Chen et al. | 380/273 |
| 2005/0175019 A1* | 8/2005 | Kalavade et al. | 370/400 |
| 2005/0177515 A1* | 8/2005 | Kalavade et al. | 705/52 |
| 2005/0216829 A1* | 9/2005 | Kalinichenko et al. | 715/513 |
| 2005/0220054 A1* | 10/2005 | Meier et al. | 370/331 |
| 2006/0019635 A1* | 1/2006 | Ollila et al. | 455/411 |
| 2007/0053309 A1* | 3/2007 | Poojary et al. | 370/256 |
| 2007/0115950 A1* | 5/2007 | Karaoguz et al. | 370/356 |
| 2008/0263633 A1* | 10/2008 | Banga et al. | 726/3 |

OTHER PUBLICATIONS

International Preliminary Report on Patentability from counterpart foreign Application No. PCT/EP2006/012195.

* cited by examiner

Legend

METHOD AND SYSTEM FOR UPDATING THE TELECOMMUNICATION NETWORK SERVICE ACCESS CONDITIONS OF A TELECOMMUNICATION DEVICE

CROSS-REFERENCE TO RELATED APPLICATIONS

This Application is a Section 371 National Stage Application of International Application No. PCT/EP2006/012195, filed Dec. 18, 2006 and published as WO 2007/071360A1 on Jun. 28, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a system and a method for updating conditions of access by a telecommunications device to services delivered by a telecommunications network.

BACKGROUND OF THE DISCLOSURE

In classic systems of access to services delivered by a telecommunications network, such as for example systems of internet access, access to television on the internet, access to IP telephony etc, each telecommunications device accesses the telecommunications network by means of an access point. When the telecommunications device is connected to the access point by a telephone type wire link and when the modulation technique used by the link is of the DSL (Digital Subscriber Line) type, the access point is called a Digital Subscriber Line Access Multiplexer (DSLAM).

For each telecommunications device connected to it, the digital subscriber line access multiplexer manages the conditions of access to the services delivered by the telecommunications network.

When the user of a telecommunications device subscribes to a new service delivered by the telecommunications network or wishes to modify the conditions of access to a service of which he is already a subscriber, the operator of the telecommunications network has to intervene at the level of the subscriber line multiplexer to modify the conditions of access of the telecommunications device to the services supplied by the telecommunications network.

The intervention time is often lengthy, sometimes of the order of some days, because it is done by employees of the telecommunications network operator.

This intervention time does not allow the operator of the telecommunications network to modify the conditions of access to the services delivered by the telecommunications network for services delivered by the network as one-time, temporary operations, for example to give the customer the possibility of trying out a new service or trying out a new quality of service of a level higher than that to which the user of the telecommunications network has subscribed.

Furthermore, since the modification of the conditions of access by the telecommunications device to the services delivered by the telecommunications network are subject to human action, the cost linked to the modification is not negligible for the operator of the telecommunications network.

There are also known techniques in which a telecommunications device has to authenticate itself in order to access services delivered by a telecommunications network. During the authentication of the telecommunications device, the digital subscriber line access multiplexer obtains the profile associated with the authentication data transferred by the telecommunications device during the process of authenticating the telecommunications device and manages the conditions of access of the telecommunications device to the services delivered by the telecommunications network from the profile obtained.

These techniques do not deal with the problem of updating the conditions of access of the telecommunications device to the services delivered by the telecommunications network.

SUMMARY

An embodiment of the invention seeks to resolve the drawbacks of the prior art by proposing a system and a method for updating the conditions of access, by a telecommunications device, to the services delivered by a telecommunications network that are speedier than the solution proposed in the prior art without making it necessary to modify or replace the elements associated with the currently existing telecommunications network such as for example the points of access to the telecommunications network.

To this end, according to a first aspect, an embodiment of the invention proposes a system for updating the conditions of access, by a telecommunications device, to services delivered by a telecommunications network, the system comprising an access point of the telecommunications network through which the telecommunications device accesses said network and a database, the system authenticating the telecommunications device by means of the access point, as a function of authentication data transferred by the telecommunications device and a profile associated with the authentication data stored by the database, the access point comprising means for the management, following a first authentication of the telecommunications device, of the conditions of access of the telecommunications system to the services delivered by the telecommunications network on the basis of the profile associated with the authentication data, characterized in that the system comprises means for generating a command for a second authentication of the telecommunications device by means of the access point following a modification of the profile associated with the authentication data.

Correlatively, an embodiment of the invention relates to a method for the updating of the conditions of access by a telecommunications device to services delivered by a telecommunications network, the telecommunications device accessing the telecommunications network by means of a point of access of said telecommunications network, the telecommunications device being preliminarily authenticated to access the services delivered by the telecommunications network, the authentication of the telecommunications device being done by means of the access point as a function of authentication data transferred by the telecommunications device, and of a profile associated with the authentication data that is stored in a database, the access point, following the authentication of the telecommunications device, managing the conditions of access of the telecommunications device to the services delivered by the telecommunications network on the basis of the profile associated with the authentication data, characterized in that the method comprises a step for generating a command for a second authentication of the telecommunications device by means of the access point following a modification of the profile associated with the authentication data.

Thus, by controlling a second authentication of the telecommunications device, although the telecommunications device has already been authenticated, an embodiment of the invention prompts the obtaining, by the access point, of a modified profile associated with the authentication data transferred by the telecommunications device. The access point thus modifies the conditions of access of the telecommunications device to the services delivered by the telecommunications network on the basis of the modified profile.

The updating of the conditions of access of the telecommunications device to the services delivered by the telecommunications network is thus done speedily.

This updating speed thus makes it possible to give the user of the telecommunications device the possibility of trying out a new service or trying out a quality of service associated with the service higher than that which he has subscribed.

According to another aspect of an embodiment of the invention, the system comprises a subscription gateway accessible through the telecommunications network.

Thus, it is not necessary to modify the different elements associated with a telecommunications network. By adding a subscription gateway accessible through the telecommunications network, an embodiment of the present invention can be implemented in an existing telecommunications network without any complex modifications being made in the elements associated with the telecommunications network.

According to another aspect of an embodiment of the invention, the subscription gateway:
  detects the access by a user of the telecommunications device to the subscription gateway,
  identifies the user of the telecommunications device,
  obtains, from the database, the profile associated with the authentication data transferred by the telecommunications device during the authentication of the telecommunications device,
  obtains information representing services delivered by the telecommunications network and/or qualities of service associated with the services delivered by the telecommunications network,
  transfers to the telecommunications device at least certain pieces of information included in the profile and at least certain pieces of information representing services delivered by the telecommunications device and/or qualities of service associated with the services delivered by the telecommunications network,
  receives from the telecommunications device at least one message of response to the information transferred,
  modifies the profile associated with the authentication data as a function of said at least one message received from the telecommunications device.

Thus, the modification of the profile associated with the authentication data is done automatically without action by the operator of the telecommunications network.

According to another aspect of an embodiment of the invention, the means of generating the command for a second authentication of the telecommunications device are included in the subscription portal.

Thus it is not necessary to modify the different elements associated with the telecommunications network.

According to another aspect of an embodiment of the invention, the system comprises an authentication server with which there is associated the database storing the profile associated with the authentication data and the means of generation of the command for a second authentication of the telecommunications device are included in the authentication server.

Thus, the updating of the conditions of access of the telecommunications device to the services delivered by the telecommunications network is done rapidly.

According to another aspect of an embodiment of the invention, the command for a second authentication of the telecommunications device is transferred to the access point.

Thus, by bringing about a second authentication of the telecommunications device, even if the telecommunications device has already been authenticated, an embodiment of the invention prompts a new reception, by the access point, of the modified profile associated with the authentication data transferred by the telecommunications device.

According to another aspect of an embodiment of the invention, the command for a second authentication of the telecommunications device is transferred to the telecommunications device.

According to another aspect of an embodiment of the invention, the telecommunications device is a first telecommunications device to which second telecommunications devices are connected.

Thus, it is only the profile associated with the authentication data transferred by the first telecommunications device that is stored in the database. The management of the database is thus simplified.

According to another aspect of an embodiment of the invention, the telecommunications device is a second telecommunications device connected to the access point by means of a first telecommunications device.

Thus, an embodiment of the present invention can be implemented without it being necessary to replace the first telecommunications devices which do not have means enabling their authentication according to an embodiment of the present invention.

Indeed, if the second telecommunications device is for example a computer, it will be easy to update this computer in order to obtain means of authentication according to an embodiment of the present invention.

According to another aspect of an embodiment of the invention, the access to the services delivered by the telecommunications network is maintained so long as the second authentication of the telecommunications device has not been negated.

Thus, access to services during the second authentication of the telecommunications device is not interrupted.

An embodiment of the invention also relates to the computer program stored in an information carrier, said program comprising instructions to implement the above-described method when it is loaded or executed by a data-processing system.

BRIEF DESCRIPTION OF THE DRAWINGS

The characteristics of the above-mentioned invention as well as other characteristics shall appear more clearly from the following description of an exemplary embodiment, said description being made with reference to the appended drawings, of which.

DETAILED DESCRIPTION OF ILLUSTRATIVE EMBODIMENTS

Figure 1:
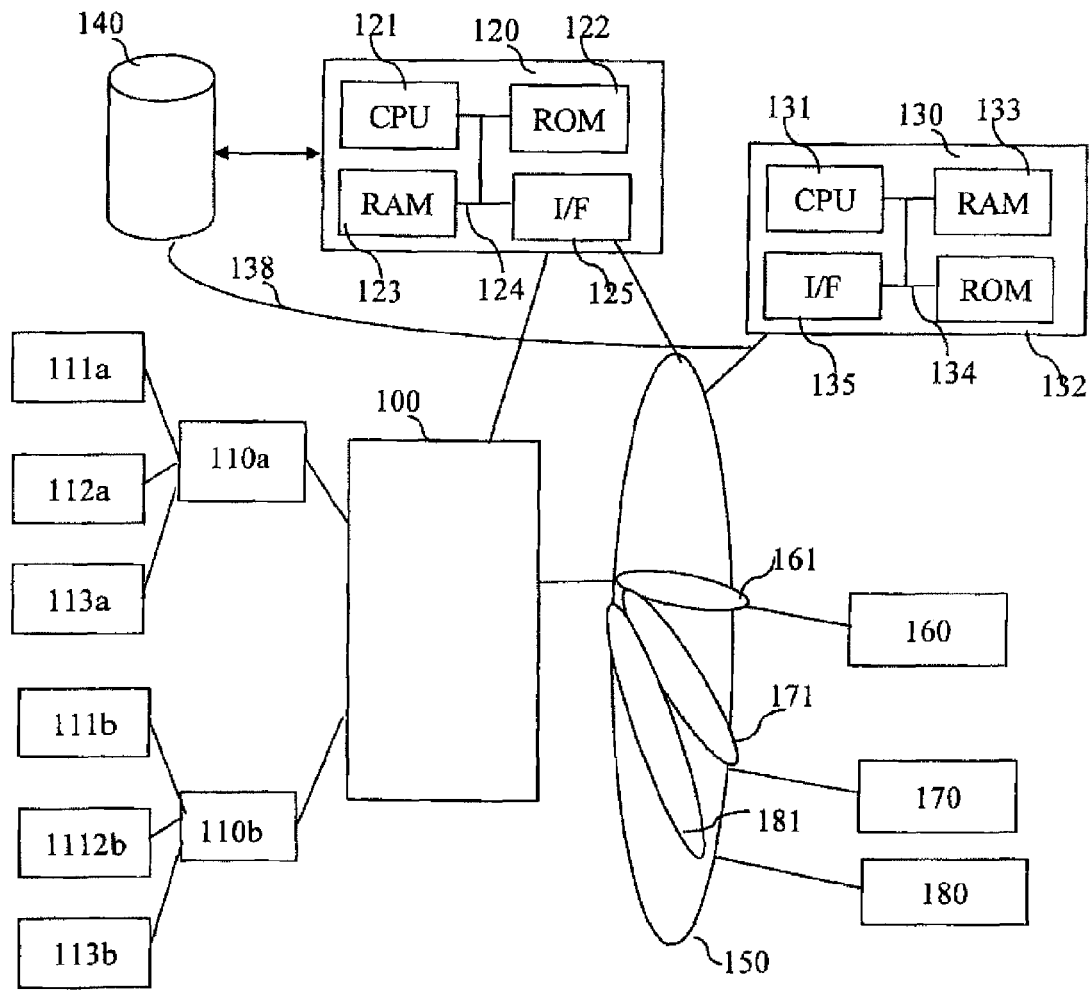
FIG. 1 shows the architecture of a system for updating conditions of access, by means of a telecommunications device, to services delivered by a telecommunications network according to an embodiment of the present invention.

FIG. 1 shows the architecture of a system for updating conditions of access, by a telecommunications device, to services delivered by a telecommunications network according to an embodiment of the present invention.

In this system for updating conditions of access to services delivered by a telecommunications network 150, first telecommunications devices 110a and 110b or second telecommunications devices 111a, 111b, 112a, 112b, 113a or 113b are provided to enable access to services provided by service providers 160, 170 and 180. The service providers 160, 170 and 180 are respectively, taken as non-exhaustive examples, an Internet access provider, an audiovisual service provider such as a television provider and/or a video-on-demand provider, a provider of telephony services on the Internet and/or video-conferencing services.

The conditions of access to the services delivered by the telecommunications network 150 are, for example and non-exhaustively: access, whether authorized or not, to the services provided by the service providers 160, 170 and 180, the quality of service associated with each service to which access is authorized, the throughput rate allocated to the authorized service, etc.

Preferably and non-exhaustively, the system for the updating of conditions of access by a telecommunications device 110, 111, 112 or 113 to services delivered by the telecommunications network 150 uses an access control protocol such as the protocol defined in the IEEE.802.1x standard.

According to the access control protocol as defined in the IEEE.802.1x standard, three elements form the access control architecture. The "supplicant" is the element seeking to access the network in requesting access thereto. The "authenticator" is the element that relays information related to supplicant's authentication to an authentication server 120. The authentication server 120 is the element that validates the supplicant's access to the telecommunications network 150. Preferably, the information is exchanged between the authenticator element and the authentication server according to the EAP (Extensible Authentication Protocol) which is itself encapsulated in the Radius protocol. The information exchanged between the supplicant and the authenticator is compliant with the EAPoL (EAP over Lan) protocol.

Preferably, the supplicant is included in the first telecommunications device 110, the authenticator is included in the access point 100 and the authentication server is the authentication server 120.

In one alternative embodiment, the supplicant element is included in a second telecommunications device 111, 112 or 113 connected to a first telecommunications device 110, the authenticator element is included in the access point 100 and the authentication server is the authentication server 120. In this alternative embodiment, the first telecommunications devices 110a and 110b transparently authorize the exchanges of frames compliant with the IEEE.802.1x standard or the EAPoL protocol.

The first telecommunications devices 110a and 110b are preferably router modems that are installed at the home of each subscriber to the services provided by the telecommunications network 150.

Each first telecommunications device 110a or 110b accesses the services delivered by the telecommunications network 150 by means of the access point 100. The first telecommunications devices 110 are connected to the access point 100 by means of radio type links such as for example links compliant with the WiMax (Worldwide interoperability for Microwave Access) or Wi-Fi (Wireless Fidelity) standards or by physical links such as pairs of telephone wires or optical fibers.

When the links are radio type links, the access point 100 is for example a WiMax terminal. When the links are pairs of copper telephone wires, the access point 100 is a digital subscriber line access multiplexer commonly called a DSLAM. When the links are optical fibers, the access point 100 is an optical concentrator.

When the links are pairs of copper wires, the first telecommunications devices 110 use DSL type modulation techniques.

The second telecommunications devices 111a, 112a, 113a are respectively connected to the first telecommunications device 110a by a wireless link, for example of the Wi-Fi type or by a wire link or by an optical link. Similarly, the second telecommunications devices 111b, 112b and 113b are connected to the first telecommunications device 110b.

For example and non-exhaustively, the second telecommunications devices 111 are computers, the second telecommunications devices referenced 112 are decoders or set top boxes and the second telecommunications devices referenced 113 are telephony-on-IP devices or video-conferencing devices. The access point 100 has a plurality of ports. Each port of the access point 100 is connected to a first telecommunications device 110. Only two first telecommunications devices 110a and 110b are shown in FIG. 1 but it can be understood that the invention also covers cases where a larger number of first telecommunications devices 110 are connected to the access point 100.

At each port, the access point 100 has a PAE (Port Access Entity) software module as described in the IEEE.802.1x standard. The PAE software module comprises a Radius client software sub-module, as recommended in the IEEE.802.1x standard, that interfaces with the authentication server 120 according to the client-server relationship mode compliant with the Radius protocol. By way of an alternative, other protocols may be used between the authenticator and the authentication server. These protocols are, for example and non-exhaustively, of the Diameter or TACACS (Terminal Access Controller Access Control System) type.

The access point 100 is connected to the telecommunications network 150 which is preferably a GigaEthernet type network. A GigaEthernet type network is a high-bit-rate communications network based on Ethernet technology. A GigaEthernet type network authorizes transfers of data at bit rates that may be greater than 1 Gigabit per second.

Telecommunications sub-networks 161, 171 and 181 are set up in the telecommunications network 150 between the access point 100 and each service provider 160, 170 and 180. The information transferred to the telecommunications sub-networks 161, 171 and 181 are transmitted in the form of Ethernet frames. The sub-networks 161, 171 and 181 are used to differentiate between the resources to which the telecommunications devices 110 or 111 or 112 or 113 have access. For example, if the user of the first telecommunications device 110a is a subscriber to the service provider 170, the exchanges between the first telecommunications device 110a and the service provider 170 are done solely by means of the sub-network 171.

If the user of the first telecommunications device 110a is a subscriber to the service provider 160, the exchanges between the first telecommunications device 110a and the service provider 160 are done by means of the sub-network 161. If the user of the first telecommunications device 110a is a subscriber to the service provider 180, the exchanges between the first telecommunications device 110a and the service provider 180 are done by means of the sub-network 181.

The telecommunications sub-networks 161, 171 and 181 are for example virtual networks called VLANs (Virtual Local Area Networks) or MPLS (Multi-Protocol Label Switching) type sub-networks or IP sub-networks.

The access point 100 is also connected to the authentication server 120 by means of a dedicated link or, as a variant, by means of the telecommunications network 150.

The authentication server 120 authenticates a telecommunications device 110, 111, 112 or 113 with the access point 100 when the telecommunications device 110, 111, 112 or 113 wishes to access a service provider 160 or 170 or 180. This authentication is done on the basis of authentication data transferred by the telecommunications device 110, 111, 112 or 113.

The authentication data is included, for example, and non-exhaustively, in a SIM card that is inserted into the telecommunications device and comprises a unique identifier of the user of the telecommunications device 110, 111, 112 or 113 or comprising a unique identifier of the telecommunications device 110, 111, 112 or 113 or comprising a user identifier of the telecommunications device 110, 111, 112 or 113 and a password which may or may not be encrypted.

This authentication is described in greater detail with reference to FIG. 2.

According to an embodiment of the invention, the authentication server 120 provides the access point 100, at the time of the authentication of a telecommunications device 110, 111, 112 or 113, with a profile associated with the authentication data transferred by the telecommunications device 110, 111, 112, 113 at the time of the authentication of the telecommunications device 110, 111, 112, 113.

This profile is stored in a database 140 and comprises, for example and non-exhaustively, the identifier of the user of the telecommunications device 110, 111, 112 or 113, the list of all the services provided by the service providers 160, 170 and/or 180 to which the user of the telecommunications device 110, 111, 112 or 113 is a subscriber, the quality of service associated with each service to which access is authorized, the bit rate allocated to each authorized service, the sub-network intended for conveying information associated with each service to which the user of the telecommunications device 110, 111, 112 or 113 is a subscriber.

The database 140 furthermore stores the authentication data transferred by each telecommunications device 110, 111, 112 or 113 recorded in order to access respectively the services offered by the service providers 160, 170 and/or 180 and respectively associate the authentication data with a profile. The database 140 is preferably associated with the authentication server 120.

The authentication server 120 is for example an authentication server RADIUS such as the one recommended in the IEEE.802.1x standard. Radius is an acronym for Remote Authentication Dial In User Service. It must be noted here that other types of servers and authentication protocols may be used in the context of an embodiment of the present invention.

The authentication server 120 has a communications bus 124 to which a central processing unit or CPU 121, a non-volatile memory 122, a random-access memory 123 and a telecommunications interface 125 are connected.

The non-volatile memory 122 stores the programs associated with at least one part of the program that shall be described here below with reference to FIG. 2. The non-volatile memory 122 is for example a hard disk drive. More generally, the programs according to an embodiment of the present invention are stored in a storage means. This storage means is readable by a computer or a microprocessor 121. This storage means may or may not be integrated into the authentication server 120 and may be detachable. When the authentication server 120 is powered on, the programs are transferred to the random-access memory 123 which then contains the executable code of an embodiment of the invention as well as data necessary to implement an embodiment of the invention.

The telecommunications interface 135 enables data exchanges toward the telecommunications network 150, the access point 100 and the database 140 associated with the authentication server 120.

It must also be noted that the access point 100 can also access the authentication server 120 by means of a relay server or "proxy-Radius" (not shown in FIG. 1) which redirects the information transferred to authentication servers (not shown in FIG. 1) associated with each service provider 160, 170 and 180. In this variant, each authentication server associated with a service provider memorizes information associated with all the telecommunications devices 110, 111, 112 or 113, or even their users authorized to access the services proposed by the service provider as well as the authentication data liable to be transferred by each telecommunications device 110, 111, 112 or 113.

The database 140 is accessible to a subscription gateway 130 by means of a link referenced 138 in FIG. 1.

The subscription gateway 130 can be accessed by the telecommunications devices 110, 111, 112 or 113 through the access point 100 and the telecommunications network 150. When a user logs into the subscription gateway 130 by using one of the telecommunications devices 110, 111, 112 or 113, for example the second telecommunications device 111a, the subscription gateway 130 identifies or even authenticates the user and, by interrogating the database 140 through the user's identifier, obtains the profile associated with the authentication data which the telecommunications device 111a of the user transfers during the procedure for authenticating the telecommunications device 111a.

The subscription gateway 130 generates, for example, a Web page representing information included in the profile associated with the authentication data as well as the set of services delivered by the telecommunications network 150 and the different qualities of service that may be associated with each service delivered by the telecommunications network 150. The subscription gateway 130 transfers the Web page to the second telecommunications device 111a.

The pieces of information contained in the profile associated with the authentication data and presented in the Web page are the list of all the services provided by the service provider 160, 170 and/or 180 to which the user of the telecommunications device 111a has subscribed, the quality of service associated with each service to which access is authorized, the bit rate allocated to each authorized service.

The subscription gateway 130 transfers the Web page to the second telecommunications device 111a.

The user of the second telecommunications device 111a selects/deselects services and/or selects a quality of service from the set of qualities of service associated with each service of which he is a subscriber or which he is subscribing to.

The subscription gateway 130, depending on the different operations performed by the user of the second telecommunications device 111a, determines whether the profile associated with the authentication data has to be modified. If the answer is yes, the subscription gateway 130 performs an updating, in the database 140 associated with the authentication server 120, of the profile associated with the authentication data which the telecommunications device 111a transfers in an authentication procedure.

The subscription gateway 130 consults and modifies the content of the database 140, for example in using an SQL (Structured Query Language) type of language or LDAP (Lightweight Directory Access Protocol).

If the profile associated with the authentication data is modified, the subscription gateway 130 generates a command for a second authentication of the telecommunications device 111a.

In another alternative embodiment, the authentication server 120 detects the fact that the profile associated with the authentication data transferred by the telecommunications device 111a during an authentication procedure has been modified, and generates a command for a second authentication of the telecommunications device 111a.

The subscription gateway 130 has a communications bus 134 to which a central processing unit or CPU 131, a non-volatile memory 132, a random-access memory 133 and a telecommunications interface 135 are connected.

The non-volatile memory 132 stores the programs associated with at least one part of the program that shall be described here below with reference to FIG. 2. The non-volatile memory 122 is for example a hard disk drive. More generally, the programs according to an embodiment of the present invention are stored in a storage means. This storage means is readable by a computer or a microprocessor 121. This storage means may or may not be integrated into the subscription gateway 130 and may be detachable. When the subscription gateway 130 is powered on, the programs are transferred to the random-access memory 133 which then contains the executable code of an embodiment of the invention as well as data necessary to implement an embodiment of the invention.

The telecommunications interface 135 enables data exchanges toward the telecommunications network 150, the access point 100 and the database 140 associated with the authentication server 120.

Figure 2:
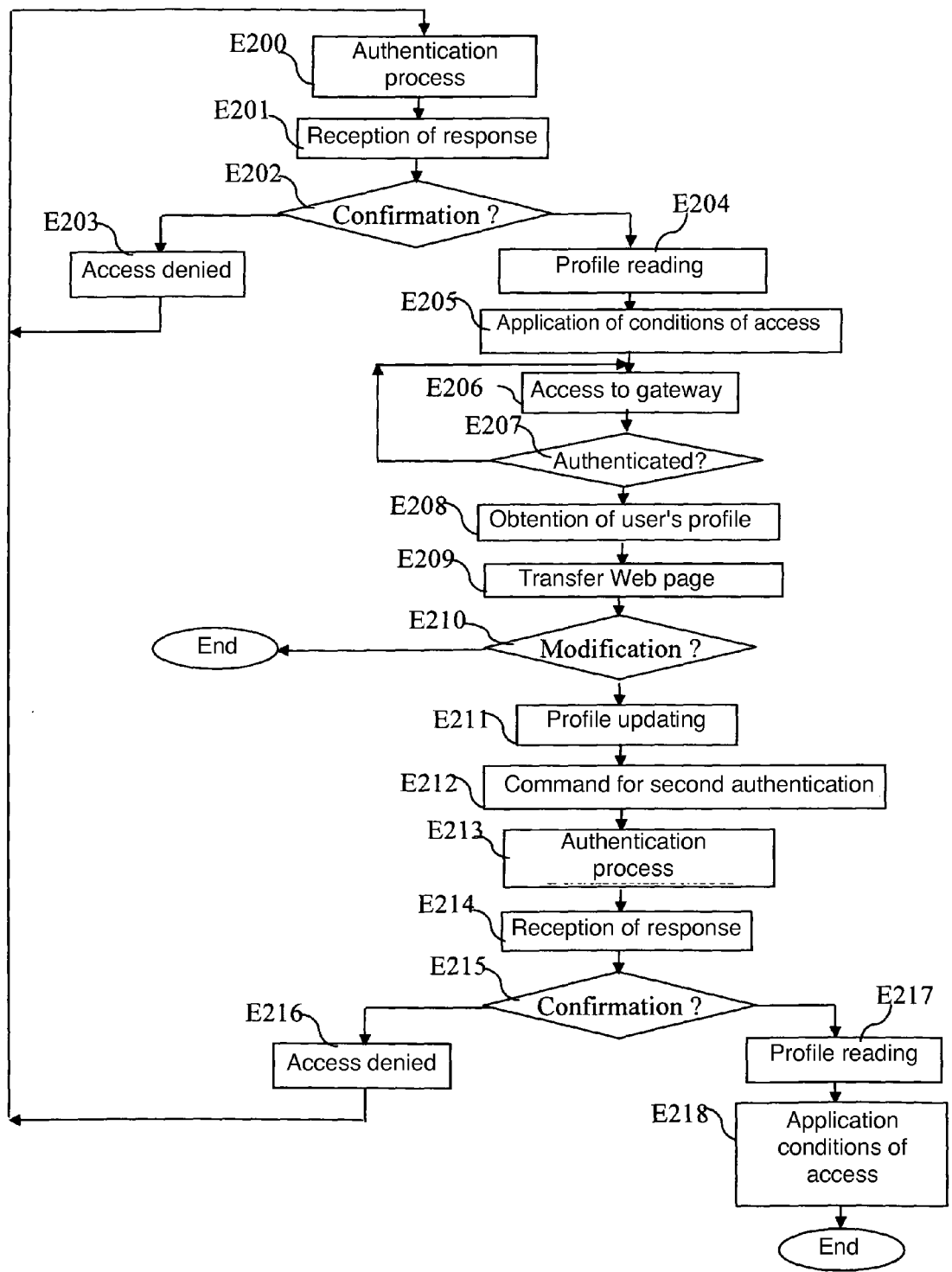
FIG. 2 represents the algorithm for updating conditions of access, by a telecommunications device, to services delivered by a telecommunications network according to an embodiment of the present invention.

FIG. 2 represents the algorithm for updating conditions of access by a telecommunications device to services delivered by a telecommunications network according to an embodiment of the present invention.

The step E200 is a first process of authentication of a telecommunications device 110, 111, 112 or 113. The access point 100 receives a request for authentication of a telecommunications device 110, 111, 112 or 113, for example the second telecommunications device 111a.

More specifically, the second telecommunications device 111a sends out an EAPoL-start type frame compliant with the EAPoL protocol to initiate the authentication process according to the 802.1x protocol.

The second telecommunications device 111a and the authentication server 120 exchange information through the PAE software module of the access point 100 according to the EAP, EAPoL and Radius protocols and as a function of the authentication method negotiated between the telecommunications device 111a and the authentication server 120. The method of authentication is, for example, of the TLS (Transport Layer Security) type as defined in the IETF document RFC2246 or of the MD5 (Message Digest 5) type.

During these exchanges, the second telecommunications device 111a gives the authentication server 120 authentication data. At the end of these exchanges, if the authentication data transmitted by the second telecommunications device 111a is validated by the authentication server 120, the authentication server 120 obtains, from the database 140, the profile associated with the authentication data transferred by the second telecommunications device 111a.

At the next step E201, the access point 100 receives a response from the authentication server 120.

At the next step E202, the access point 100 makes a check to see if the response transmitted by the authentication server 120 confirms the authentication of the second telecommunications device 111a.

If the response transmitted by the authentication server 120 negates the authentication of the telecommunications device 111a, the access point 100 passes to the step E203 which consists in leaving the port to which the second telecommunications device 111a is connected in the "non-authorized" state and therefore in prohibiting access to services delivered by the telecommunications network 150. The access point 100 then returns to the step E200 pending a new authentication request.

If the answer is yes, the access point 100 goes to the step E204.

At this step, the access point 100 reads, in the response of the authentication server 120 received at the step 201, the profile associated with the authentication data transferred by the second telecommunications device 111a.

At the following step E205, the access point 100 manages the conditions of access of the second telecommunications device 111a to the services delivered by the telecommunications network 150.

The access point 100 authorizes or does not authorize access to the sub-networks 161, 171 and 181 depending on the profile associated with the authentication data transferred by the second telecommunications device 111a and applies the quality of service associated with each authorized service.

At the next step E206, the subscription gateway 130 detects the reception of a message coming from the second telecommunications device 111a.

The following step E207 consists of an identification and preferably an authentication of the user of the second telecommunications device 111a, for example by interrogation of the identifier and password of the user of the second telecommunications device 111a. If the authentication of the user of the second telecommunications device 111a fails, the subscription gateway 130 returns to the step 206. If the user of the second telecommunications device 111a is authenticated, the subscription gateway 130 passes to the step E208.

At the step E208, the subscription gateway, through the link 138, questions the database 140 from the identifier of the user of the second telecommunications device 111a and obtains the profile associated with the authentication data which the second telecommunications device 111a transfers during a process of authentication of the second telecommunications device 111a.

It must be noted here that in one alternative embodiment, the authentication of the user can be done automatically and transparently for the user by an exchange of keys or certificates. At the next step E209, the subscription gateway 130 generates a Web page representing all the services provided by the service providers 160, 170 and/or 180 to which the user of the second telecommunications device 111a subscribes, the quality of service associated with each service to which access is authorized, the bit rate allocated to each authorized service from the information included in the profile associated with the authentication data as well as the set of services delivered by the telecommunications network 150 and the different qualities of service which may be associated with each service delivered by the telecommunications network 150, and transfers the Web page to the second telecommunications device 111*a*.

The user of the second telecommunications device 111*a* selects and/or deselects services and/or selects a quality of service from the set of qualities of service associated with each service of which he is a subscriber or which he is subscribing to.

At the next step E210, the subscription gateway 130, as a function of the different operations performed by the user of the second telecommunications device 111*a*, determines whether the profile associated with the authentication data transferred by the telecommunications device 111*a* during a process of authentication of the telecommunications device 111*a* must be modified. If the response is negative, the subscription gateway 130 interrupts the present algorithm. If the profile associated with the authentication data must be modified, the subscription gateway 130 goes to the step E211 and updates the profile associated with the authentication data in the database 140.

As a variant, the subscription gateway 130 does not execute the step E210 and passes to the step E211 and systematically updates the profile associated with the authentication data in the database 140.

It must be noted here that in one alternative embodiment, the steps E206 to E210 are not performed by the subscription gateway 130. According to this variant, the user of the second telecommunications device 111*a* calls a telephone assistance service of the operator of the telecommunications network 150 or goes to an agency of the operator of the telecommunications network 150 to consult and modify the conditions of access to the services provided by the telecommunications network 150.

According to another alternative embodiment of the steps E206 to E210, the subscription gateway 130 generates a representation of at least one part of the information contained in the profile associated with the authentication data as well as all the services delivered by the telecommunications network 150 and the different qualities of service that may be associated with each service delivered by the telecommunications network 150. This representation is compatible with the telecommunications device 110, 111, 112 or 113 used by the user. For example, the subscription gateway 130 generates a pattern enabling the user of the second telecommunications device 112*a* to select the television channels to which he wishes to subscribe with the remote control of the telecommunications device 112*a*. In another embodiment, the steps E206 to E210 are not performed by the subscription gateway 130. The operator of the telecommunications network 150 decides to modify the conditions of access to the services delivered by the telecommunications network 150 without the intervention of the user of the second telecommunications device 111*a*. This for example is the case when the operator of the telecommunications network decides to make a special offer, which may or may not be time-bound, for certain services delivered by the telecommunications network 150 or propose a trial for a quality of service associated with a service of a higher level than the one included in the profile associated with the authentication data. Similarly, if the second telecommunications device 111*a* or its user is not considered to be reliable by the operator of the telecommunications network 150, this operator can reduce or even remove its or his access to the services delivered by the telecommunications network 150.

At the step E212, a command for a second authentication of the second telecommunications device 111*a* is generated.

Preferably, the command for a second authentication of the second telecommunications device 111*a* is generated by the authentication server 120 following the detection of an updating of the profile associated with the authentication data in the database 140.

As a variant, the command for a second authentication of the second telecommunications device 111*a* is generated by the subscription gateway 130.

In another alternative embodiment, the command for a second authentication of the second telecommunications device 111*a* is generated by a device of the telecommunications network 150 when this network is informed, for example by the subscription gateway 130, of the updating in the database 140 of the profile associated with the authentication data.

Preferably, the command for a second authentication of the second telecommunications device 111*a* is transmitted to the access point 100. The access point 100, upon reception of this command, transfers an authentication command to the second telecommunications device 111*a*. This authentication command is for example a "reauth" type command as described in the IEEE.802.1x protocol.

It must be noted here that the "reauth" command maintains access to services delivered by the telecommunications network 150 so long as the second authentication of the second telecommunications device 111*a* is not negated by the authentication server 120. In one alternative embodiment the command for a second authentication of the second telecommunications device 111*a* is transmitted to the second telecommunications device 111*a*. This command which is aimed at taking control of the second telecommunications device 111*a* disconnects the second telecommunications device 111*a* from the access point 100 in controlling the transfer by the second telecommunications device 111*a* to the access point 100 of an EAPoL-Logoff type frame of the EAPoL protocol. This command also prompts a new connection of the second telecommunications device 111*a* in controlling the transfer, by the second telecommunications device 111*a*, to the access point 100 of an EAPoL-Start type frame of the EAPoL protocol.

The following step E213 is a second authentication process. The second authentication process is identical to the first authentication process described in the step E200. It shall therefore not be described any further.

At the next step E214, the access point 100 receives a response from the authentication server 120.

At the next step E215, the access point 100 makes a check to see whether the response transmitted by the authentication server 120 is a confirmation of the authentication of the second telecommunications device 111*a*.

If the response transmitted by the authentication server 120 negates the authentication of the second telecommunications device 111*a*, the access point 100 passes to the step E216 which consists in placing the port to which the second telecommunications device 111*a* is connected in the "non-authorized" state and therefore in prohibiting access to the services delivered by the communications network 150. The access point 100 then returns to the step E200 pending a new authentication query.

If the step E215 is positive, the access point 100 goes to the step E217.

At this step, the access point 100, reads the profile associated with the authentication data transferred by the second telecommunications device 111*a* in the response of the authentication server 120 received at the step E214.

At the next step E218, the access point 100 manages the conditions of access of the second telecommunications device 111a to the services delivered by the telecommunications network 150.

The access point 100 authorizes the access or does not authorize access to the sub-networks 161, 171 and 181 depending on the profile associated with the authentication data transferred by the second telecommunications device 111a and applies the quality of service associated with each authorized service.

Thus, the access point 100 updates the conditions of access of the second telecommunications device 111a.

Although the present disclosure has been described with reference to one or more examples, workers skilled in the art will recognize that changes may be made in form and detail without departing from the scope of the disclosure and/or the appended claims.

The invention claimed is:

1. System for updating conditions of access, by a telecommunications device, to services delivered by a telecommunications network, the system comprising:
    a database,
    an access point of the telecommunications network through which the telecommunications device accesses said telecommunications network during a first authentication, the access point comprising means to manage the conditions of access of said telecommunications device to the services delivered by the telecommunications network on a basis of a profile previously stored by the database during said first authentication, said profile being associated with authentication data transmitted by the telecommunications device during said first authentication by said system, and said profile comprising a list of services delivered by the telecommunications network to which a user of the telecommunications device has subscribed, the services in the list being services for which access by the telecommunications device is controlled by the access point,
    means for generating a command configured to initiate a second, re-authentication of the telecommunications device by the access point for the services delivered by the telecommunications network of which the conditions for access are managed by the access point, wherein the means for generating generates the command automatically in response to a modification of said list of services delivered by the telecommunications network for the profile associated with the authentication data, and
    means for maintaining access to services delivered by the telecommunications network so long as the second authentication of the telecommunications device has not been negated.

2. System according to claim 1, wherein the system comprises a subscription gateway accessible through the telecommunications network and wherein the means for generating the command for the second authentication of the telecommunications device are included in a subscription portal.

3. System according to claim 1, wherein the system comprises an authentication server with which there is associated the database storing the profile associated with the authentication data and wherein the means for generating of the command for the second authentication of the telecommunications device are included in the authentication server.

4. System according to claim 1, wherein the means for generating the command for the second authentication of the telecommunications device transfer the command for the second authentication to the access point.

5. System according to claim 1, wherein the means for generating the command for the second authentication of the telecommunications device transfer the command for the second authentication to the telecommunications device.

6. System according claim 5, wherein the telecommunications device is a first telecommunications device to which second telecommunications devices are connected.

7. System according to claim 5, wherein the telecommunications device is a second telecommunications device connected to the access point by a first telecommunications device.

8. Network equipment constituting a subscriber gateway accessible by at least one telecommunications device, through an access point to a telecommunications network, wherein the at least one telecommunication device transmits authentication data during a first authentication of the at least one telecommunication device, and wherein the subscriber gateway comprises:
    a processor; and
    a memory storing instructions that, when executed by the processor, configures the subscriber gateway to generate a command configured to initiate a second, re-authentication of the at least one telecommunications device by the access point for services delivered by the telecommunications network of which conditions for access are managed by the access point, wherein the instructions are configured such that the subscriber gateway generates the command automatically in response to a modification of a list of services delivered by the telecommunications network for a profile associated with authentication data transmitted by the at least one telecommunications device during the first authentication of the at least one telecommunication device, the services in the list being services for which a user of the telecommunications device has subscribed and for which access by the telecommunications device is controlled by the access point, and wherein access to the services delivered by the telecommunications network are maintained so long as the second authentication of the telecommunications device has not been negated.

9. Authentication server accessible by at least one telecommunications device, through an access point to a telecommunications network, wherein the at least one telecommunication device transmits authentication data during a first authentication of the at least one telecommunication device, and wherein the authentication server comprises:
    a processor; and
    a memory storing instructions that, when executed by the processor, configures the subscriber gateway to generate a command configured to initiate a second, re-authentication of the at least one telecommunications device by the access point for services delivered by the telecommunications network of which the conditions for access are managed by the access point, wherein the instructions are configured such that the authentication server generates the command automatically in response to a modification of a list of services delivered by the telecommunications network for a profile associated with authentication data transmitted by the at least one telecommunications device during the first authentication of the at least one telecommunication device, the services in the list being services for which a user of the telecommunications device has subscribed, for which access by the telecommunications device is controlled by the access point, and wherein access to the services delivered by the telecommunications network are maintained so long as the second authentication of the telecommunications device has not been negated.

10. Method for updating conditions of access, by a telecommunications device, to services delivered by a telecommunications network, the telecommunications device accessing the telecommunications network through an access point of said telecommunications network during a first authentication, the method comprising:

a step of managing conditions of access of the telecommunications device to services delivered by the telecommunications network on a basis of a profile stored by a database, said profile being associated with authentication data transmitted by the telecommunications device during said first authentication of the telecommunications device, said profile comprising a list of services delivered by the telecommunications network to which a user of the telecommunications device has subscribed, the services in the list being services for which access by the telecommunications device is controlled by the access point;

a step of generating a command with a device connected to the telecommunications network, wherein the command is configured to initiate a second, re-authentication of the telecommunications device by the access point for the services delivered by the telecommunications network of which the conditions for access are managed by the access point, and wherein the command is generated automatically in response to a modification of said list of services delivered by the telecommunications network for the profile associated with the authentication data; and a step of maintaining access to services delivered by the telecommunications network so long as the second authentication of the telecommunications device has not been negated.

11. Method for updating the conditions of access according to claim 10, wherein the method comprises, in a subscription gateway, prior to generating the command for the second authentication:

a step of detecting an access by a user of the telecommunications device, a step of identifying the user of the telecommunications device, a first step of obtaining, from a database, a profile associated with an authentication data transferred by the telecommunications device during its authentication, a first step of obtaining information representing services delivered by a telecommunications network and/or qualities of service associated with the services delivered by the telecommunications network, a step of a transfer to a telecommunications device of at least certain of some pieces of information representing services delivered by the telecommunications device and/or qualities of service associated with the services delivered by the telecommunications network, a step of reception, from the telecommunications device, of at least one message of response to the pieces of information transferred, a step of modification of the profile associated with the authentication data as a function of said at least one message received from the telecommunications device.

12. A non-transitory information carrier comprising a computer program stored thereon and comprising instructions for implementing a method for updating conditions of access, by a telecommunications device, to services delivered by a telecommunications network, the telecommunications device accessing the telecommunications network through an access point of said telecommunications network during a first authentication, when the instructions are executed by a processor, the method comprising:

a step of managing conditions of access of the telecommunications device to services delivered by the telecommunications network on a basis of a profile stored by a database, said profile being associated with authentication data transmitted by the telecommunications device during said first authentication of the telecommunications device, said profile comprising a list of services delivered by the telecommunications network to which a user of the telecommunications device has subscribed, the services in the list being services for which access by the telecommunications device is controlled by the access point;

a step of generating with the processor a command configured to initiate a second, re-authentication of the telecommunications device by the access point for the services delivered by the telecommunications network of which the conditions for access are managed by the access point, wherein the command is generated automatically in response to a modification of said list of services delivered by the telecommunications network for the profile associated with the authentication data; and a step of maintaining access to services delivered by the telecommunications network so long as the second authentication of the telecommunications device has not been negated.

* * * * *

UNITED STATES PATENT AND TRADEMARK OFFICE
CERTIFICATE OF CORRECTION

PATENT NO. : 8,954,547 B2
APPLICATION NO. : 12/158381
DATED : February 10, 2015
INVENTOR(S) : David Minodier et al.

Page 1 of 1

It is certified that error appears in the above-identified patent and that said Letters Patent is hereby corrected as shown below:

On The Title Page, Item (57)

In the abstract, line 13, delete "profiled associated" and insert --profile associated--.

Signed and Sealed this
Tenth Day of May, 2016

Michelle K. Lee
*Director of the United States Patent and Trademark Office*